Feb. 16, 1932.　　　E. A. SANGUINET　　　1,845,724
BIRD OR ANIMAL FEEDING DEVICE
Original Filed Feb. 28, 1930
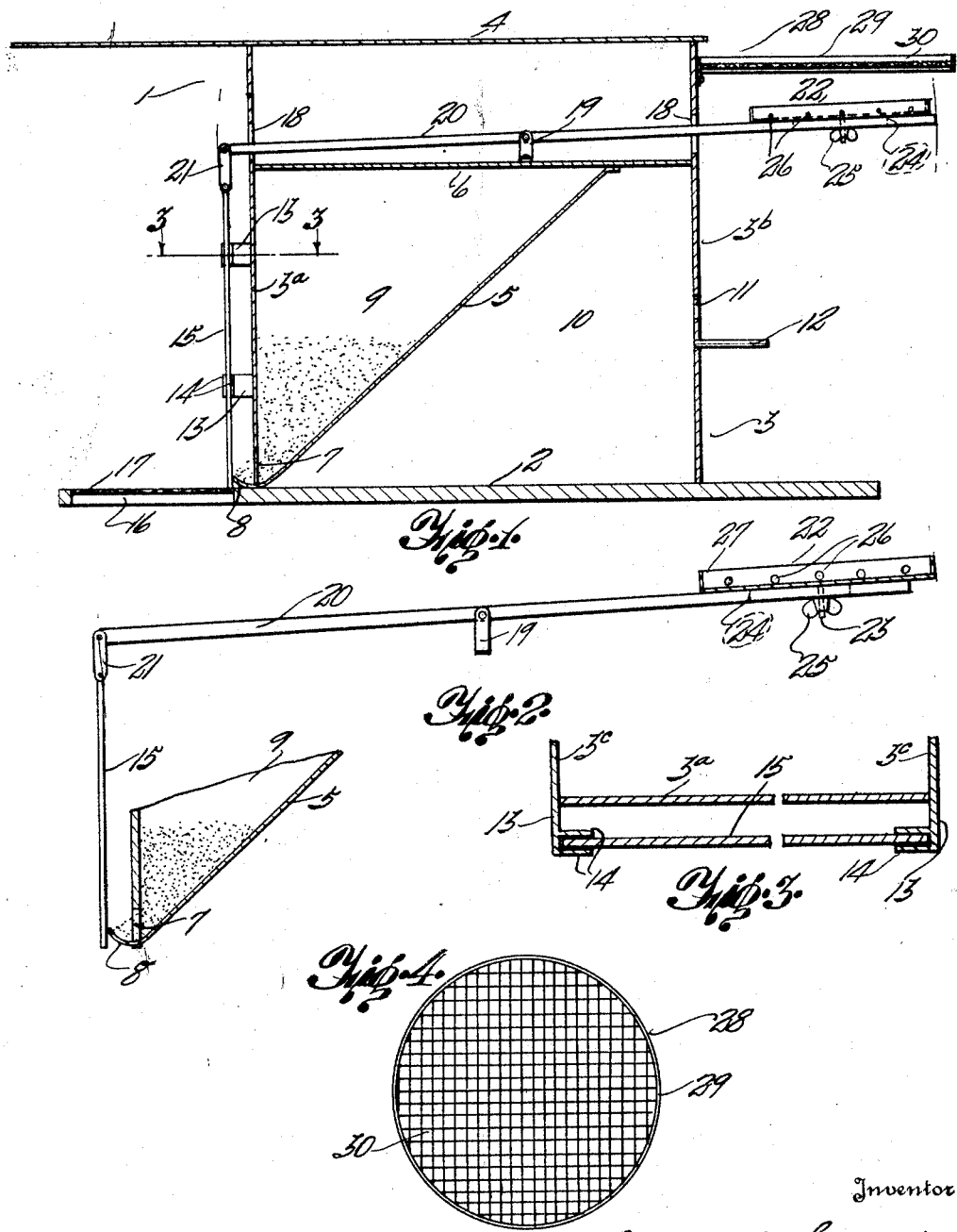

Patented Feb. 16, 1932

1,845,724

UNITED STATES PATENT OFFICE

EDWARD A. SANGUINET, OF WEBSTER GROVES, MISSOURI

BIRD OR ANIMAL FEEDING DEVICE

Application filed February 28, 1930, Serial No. 432,039. Renewed November 30, 1931.

This invention is a device for feeding birds and animals in stormy, sleety or snowy weather, when the ground becomes so covered with snow or ice that the birds or animals cannot procure their feed in the normal manner.

The main object of the invention is to provide a feeding mechanism for use in connection with a feed hopper or container of any kind, which feeding mechanism will be automatically operated by the fall of snow or sleet to expose the feed to the birds or animals so that they may obtain their food from the hopper or container only when they cannot feed from the ground or elsewhere in the usual manner.

Another object is to provide a feeding mechanism of the above stated character in a simple, durable and efficient form which may be readily adapted for use upon a food container of any shape or size.

Still another object is to provide a feeder of the kind described, and wherein otherwise waste space in the structure is utilized to form and provide a bird house.

The foregoing and other objects together with means whereby the same may be carried into effect will best be understood from the following description of one embodiment of the invention, an adaptation for feeding birds, taken in connection with the accompanying drawings wherein:

Figure 1 is a longitudinal section through a feed hopper equipped with my invention.

Figure 2 is an enlarged side view of the feeding mechanism alone except for a section of a feed hopper.

Figure 3 is an enlarged section along the line 3—3 in Figure 1.

Figure 4 is an enlarged plan view of the protecting covering for placing over the pan of the feeding mechanism.

In the embodiment of my invention shown in the drawings I provide a house or housing 1 seated on the base 2 and having the walls 3 and roof 4. A partition 5 is secured to a ceiling 6 supported within the walls $3a, 3b, 3c$, and this partition slopes forwardly and downwardly towards the front wall $3a$ which has an outlet opening 7 through which the upwardly curved lip 8 of the said partition extends as shown, and forms a feed trough. By this construction a hopper or container 9 is provided for the feed and the remaining space 10 within the housing 1 and below the ceiling 6 may be utilized as a bird nesting compartment or shelter if so desired. For this purpose a door 11 is provided through the rear wall $3b$ of the housing and a perch 12 is extended from this wall below the aperture.

Brackets 13 are extended forwardly from the side walls $3c$ of the housing 1 and have spaced inwardly turned fingers 14 at their forward ends between which a closure or door 15 is slidably mounted as shown. The said closure or door 15 is thus supported forwardly of the front wall of the housing a sufficient distance so that it will clear the outer edge of the trough or lip 8 of the partition 5 when in its lowermost or closed position. It will be understood that this mounting of the door will allow it to close fully and completely shut off all access to the feed as it runs from the hopper through the outlet opening 7 into the trough 8. An opening 16 is provided through the base 2 in front of the trough 8 and this opening is covered by a screen 17 to prevent the collection of feed, snow or waste upon the base which would tend to hinder the proper closing of the door 15. Aligned slots 18 are provided through the front and rear walls of the housing 1 above the ceiling 6 and a forked bearing 19 is secured to this ceiling 6 in alignment with these slots 18. An arm 20 is pivotally fulcrumed intermediate its ends between the forks of the bearing 19 and extends loosely through the slots 18 as shown. A link 21 is pivotally connected between the forward end of the arm 20 and the upper margin of the closure 15, so that a downward movement of the rear end of the said arm 20 will bring about an upward movement of the closure 15 to expose the feed in the trough 8.

A pan or receptacle 22 is provided and the same has a threaded stud 23 depended from its bottom, which stud is adapted to extend through a longitudinally extended slot 24 provided in the rear end of the arm 20. A wing nut 25 is provided to secure the pan 22 in any adjusted position on the arm. A plurality of small apertures 26 are provided through the rim 27 of the pan adjacent the bottom thereof in order to allow rain or melted sleet or snow to flow freely from the pan. A protecting perforate shield 28 is provided the same comprising an annulus 29 secured to the housing 1 immediately above the pan 22 and supporting a screen 30 as shown. Normally the relative weights and adjustment balancing of the door 15 as against the pan 22 is such that the door 15 will stand closed, but any additional weight applied upon the pan 22 will serve to over-balance and raise the door 15.

It will now be understood that during a fall of sleet or snow the same will collect in the pan 22 and weight that end of the arm 20 down, causing the arm 20 to swing as hereinbefore described, so as to raise the door 15 and expose the feed in the trough 8. By virtue of the apertures 26 provided in the pan for the escape of rain and the like the arm 20 will only be operated during cold weather when the ground is covered with snow or the like which prevents the birds or animals from finding their food in the usual manner. As the weather turns warm any accumulated snow or ice will melt and run out through said apertures. The pan 22 may be adjusted on the arm 20 by means of the stud 23 and nut 25 to obtain the proper balance between the pan and door 15 so that the door will hang downwardly of its own weight until the pan becomes weighted by the snow or sleet enough to draw it up. The protecting shield 28 prevents the accumulation of twigs or the like on the pan 22 and prevents birds or animals from alighting upon or sitting on the pan. The shelter 10 utilizes otherwise waste space, and provides a retreat for the birds in stormy weather which is convenient to the feed.

It is obvious that by only minor changes the operating mechanism of the feeding device may be used upon food containers of various shapes and sizes and such changes are considered within the scope of the invention.

While I have herein set forth a certain preferred embodiment of my invention it is understood that I may vary from the same in minor structural details, not departing from the spirit of the invention and within the scope of the appended claims.

I claim:

1. In a device of the character described, a food container, a movable closure therefor and means whereby the closure is temporarily withdrawn from the container by the accumulated weight of falling sleet or snow the said means comprising an arm fulcrumed on the container and connected at one end to the said closure, and a pan mounted on the free end of the arm for catching snow or sleet.

2. In a device of the character described, a food container having an outlet, a closure movably mounted over the outlet, an arm fulcrumed on the container and connected at one end to the said closure and a pan adjustably mounted on the free end of the arm and adapted to catch falling snow or sleet as a counter balance for the closure.

3. In a device of the character described, a food container having an outlet, a closure movably mounted over the outlet, an arm fulcrumed on the container and connected at one end to the said closure and a pan adjustably mounted on the free end of the arm and adapted to catch falling snow or sleet as a counter balance for the closure, the said pan having a plurality of apertures through its rim to permit the egress of water from the pan without operation of the closure.

4. In a device of the character described, a food container having an outlet opening, a closure movably mounted over the said opening, an arm fulcrumed on the container and connected at one end to the said closure, a pan adjustably mounted on the free end of the said arm, the said pan having a plurality of apertures through its rim and a reticulated protecting element supported over the said pan.

5. In a device of the kind described, a housing having a food compartment and a bird nesting compartment, the said food compartment having an outlet opening through the wall of the housing, a closure slidably mounted on the housing and normally covering the said outlet opening, an arm fulcrumed on the housing and connected to the closure at one end, a pan adjustably mounted on the free end of the said arm and exposed to the elements, the said pan having a plurality of apertures through its rim and a reticulated protecting hood mounted on the said housing above the pan.

6. In a device of the kind described, a food container, a movable closure therefor, a pan exposed to the elements, and means connecting the pan and closure whereby the latter will be opened by the accumulation of snow or sleet in the pan.

7. In a device of the kind described, a food container, a movable closure therefor, a snow or sleet catching element, and means connecting the snow or sleet catching element and the closure whereby the latter will be opened by the fall of snow or sleet.

In testimony whereof I affix my signature.

EDWARD A. SANGUINET.